(12) United States Patent
Haneball et al.

(10) Patent No.: US 7,819,036 B2
(45) Date of Patent: Oct. 26, 2010

(54) ELECTROMOTIVE LINEAR DRIVE

(75) Inventors: Frank Haneball, Steinheim (DE); Christian Müller, Steinheim (DE)

(73) Assignee: Dewert Antriebs- und Systemtechnik GmbH, Kirchlengern (DE)

( * ) Notice: Subject to any disclaimer, the term of this patent is extended or adjusted under 35 U.S.C. 154(b) by 1314 days.

(21) Appl. No.: 10/544,893

(22) PCT Filed: Feb. 12, 2004

(86) PCT No.: PCT/EP2004/001286
§ 371 (c)(1),
(2), (4) Date: Aug. 5, 2005

(87) PCT Pub. No.: WO2004/071244
PCT Pub. Date: Aug. 26, 2004

(65) Prior Publication Data
US 2006/0091762 A1    May 4, 2006

(30) Foreign Application Priority Data
Feb. 13, 2003    (DE) .............. 203 02 412 U

(51) Int. Cl.
*F16H 27/02*    (2006.01)
(52) U.S. Cl. .................................... 74/89.33
(58) Field of Classification Search ........... 74/84 R, 74/89, 89.23, 89.32, 89.33, 89.37, 89.13, 74/89.14, 89.16
See application file for complete search history.

(56) References Cited

U.S. PATENT DOCUMENTS

| | | | |
|---|---|---|---|
| 2,424,492 A * | 7/1947 | Morris | ............ 74/89.37 |
| 4,557,153 A | 12/1985 | Ulbing | |
| 4,584,902 A | 4/1986 | Fry | |
| 4,858,481 A | 8/1989 | Abraham | |
| 5,593,313 A | 1/1997 | Shibuya et al. | |
| 5,809,833 A * | 9/1998 | Newport et al. | ............ 74/89.37 |
| 6,772,653 B1 * | 8/2004 | Franksson | ............ 74/89.36 |

FOREIGN PATENT DOCUMENTS

| | | |
|---|---|---|
| DE | 38 43 967 A | 6/1990 |
| DE | 94 04 383 | 6/1994 |
| DE | 197 31 210 | 1/1998 |
| DE | 298 11 566 | 10/1998 |

(Continued)

*Primary Examiner*—Vicky A Johnson
(74) *Attorney, Agent, or Firm*—Henry M. Feiereisen; Ursula B. Day

(57) ABSTRACT

An electromotive linear drive unit comprising a housing, a motor pot, a connection piece, a power supply cable, a deployable lifting tube, and a fixed flanged tube is designed in such a way that it can be made at a low cost while being easier to assemble than previously known embodiments thereof. In accordance with the invention, at least the connection zones of the housing (11) to the motor pot (12) and the attachment part (13) are configured in a cylindrical manner while the connection zone are formed by means of a rotary motion of the housing (11) and/or the motor pot (12) and/or the attachment part (13) in a radial direction. The connection zones are configured form-fittingly in an axial direction. This type of connection is realized by means of meshing threads. The linear drive according to the invention is particularly suitable for driving the adjustable components of a slatted frame or armchair.

12 Claims, 6 Drawing Sheets

FOREIGN PATENT DOCUMENTS

| | | |
|---|---|---|
| DE | 298 12 376 | 10/1998 |
| DE | 298 20 233 | 7/1999 |
| DE | 200 05 065 | 6/2000 |
| DE | 198 53 942 | 7/2000 |
| DE | 201 13 940 | 11/2001 |
| EP | 1 247 477 A | 10/2002 |
| FR | 2 632 460 A | 12/1989 |
| FR | 2 810 018 A | 12/2001 |
| JP | 11 074657 A | 3/1999 |
| JP | 2001 077552 | 3/2001 |
| WO | WO 02/03903 A | 1/2002 |
| WO | WO 02/29284 A | 4/2002 |

* cited by examiner

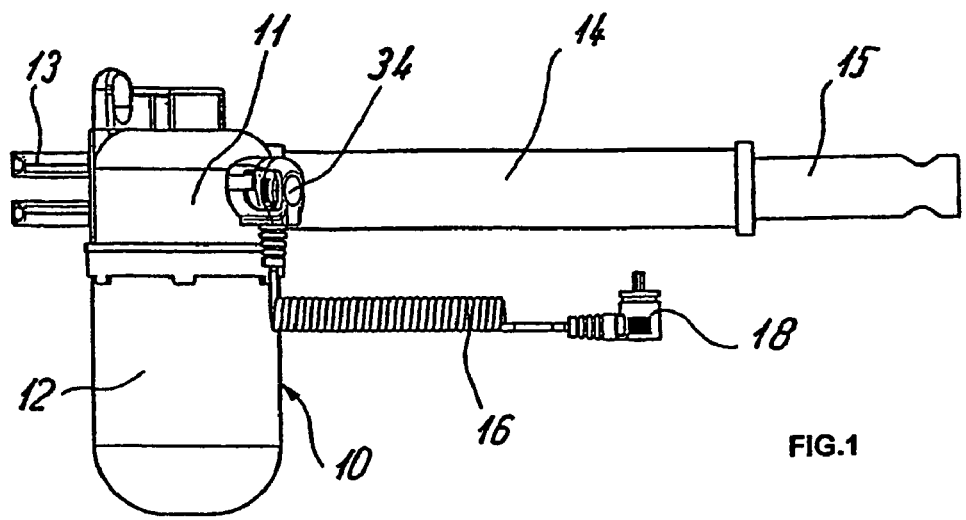
FIG.1
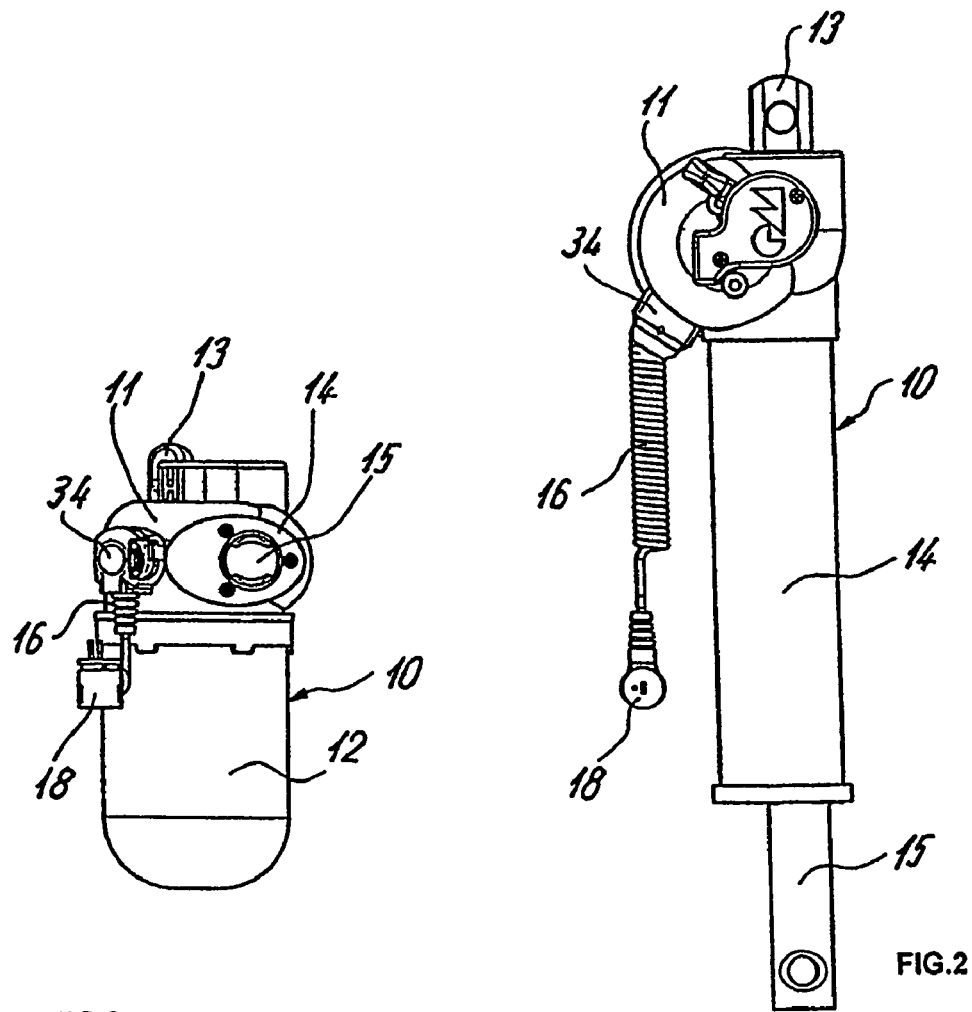
FIG.3
FIG.2

ELECTROMOTIVE LINEAR DRIVE

BACKGROUND OF THE INVENTION

The invention relates to an electromotive linear drive having a housing, a motor pot, an attachment element as well as a power feed cable, an extendible lifting tube, and a fixed flanged tube.

The electromotive drive involved here is applicable in particular for adjusting moving parts of a piece of furniture, for example a slatted frame, an armchair, and the like. A preferred embodiment of the linear drive involves a spindle drive, i.e. a spindle is rotatably driven via a gear mechanism to reduce the motor speed. A spindle nut restrained against rotation travels upon the spindle.

The spindle nut is connected to the lifting tube which is linked in driving relationship with the component to be adjusted. This may be implemented via a simple lever or via a fitting, for example.

The lifting tube may be configured either as attachment element in its free end zone or an attachment element, for example a fork head, may be placed thereon.

The fork head associated to the housing serves as torque support.

Such a drive is known, for example, from DE 94 04 383.3. In this linear drive, the housing, motor pot and fork head are made as a single-piece form part. Although the use of one mold is thus only required to make this form part through an injection molding process, the ease of assembly is, however, adversely affected thereby. As such drives are manufactured on a large scale, assembly costs are relatively high.

SUMMARY OF THE INVENTION

The invention is based on the object to configure an electromotive drive of a type as described above in greater detail, which can be made more cost-efficiently compared to conventional designs and is more assembly-friendly.

The posed object is attained by cylindrically configuring the connection zones of the housing with the motor pot and the attachment part, by realizing the connection zones in radial direction through a rotary motion of the housing and/or the motor pot and/or the attachment part, and by form-fittingly designing the connection zones in axial direction.

The motor pot and the attachment element can now be connected with the housing, when components of the linear drive have already been mounted. As the connection zones are form-fitting in axial direction, i.e. in the direction of the longitudinal center axis of the motor pot and in the direction of the longitudinal center axis of the attachment part, a respective shift is effectively prevented during operation of the linear drive.

As the connections in radial directions are implemented by rotary motions, the connection zones can be manufactured especially easily because the rotary motions can be realized by structurally simple means.

The connections formed by the rotary motions are realized in a most simple manner by interlocking threads. As the parts to be connected to one another are made of plastic by an injection molding process, the threads can be molded at the same time in one operating cycle.

According to a preferred embodiment, the housing is provided with the internal threads, and the motor pot and the attachment part are provided with external threads.

The connections of the housing with the motor pot and the attachment part can be realized through rotation even when the connections are configured as a bayonet joint, i.e. one part is initially inserted into the other one and then secured by turning. In the event the connections are realized by interlocking threads, the housing could be provided with external threads and/or internal threads. The motor pot and the attachment part are provided with corresponding threads. As a result, the motor pot may be provided with internal threads and/or external threads, and the attachment part may also be provided with external threads and/or internal threads. Preferred however is a configuration of the housing with either external threads or internal threads for connection with the motor pot and the attachment part.

According to another embodiment, the motor pot may be configured as ring element and closely placed in the annular gap between the motor and the housing. Such a configuration does not necessarily require a threaded engagement of both components with one another. However, a preferred configuration involves a correspondence of the ring element, forming the motor pot, with the threads of the housing. According to a further design, it is provided to configure the casing of the motor in pot shape and open on the housing proximal side, and to place a seal in the formed annular gap, preferably on the housing-proximal side.

The inner thread of the housing and the outer thread of the attachment element or the fork head have multiple threads in order to secure the attachment part, preferably the fork head in various positions in relation to the housing. Hereby, especially a multi-threaded configuration is contemplated because the attachment element can then be secured in preferably two positions.

Although the interlocking threads can be firmly tightened, so that a certain force application for reversal is required, it is provided to additional secure the connections. This may be realized, for example, by using resilient tongues, bolts, or pins, which engage in respective recesses. In this way, a certain position especially for the attachment part would be secured.

Resilient locking elements have the further advantage that no additional securing elements, for example bolts or the like, have to be rotated into the housing or motor pot or the attachment element.

In particular the securement of the motor pot may be realized in the absence of resilient locking tongues or the like. As an alternative, the motor pot is provided with a radial tooth system extending on a circular ring, and the motor pot has at least one locking tooth which engages behind a tooth of the radial tooth system so that unscrewing of the motor pot from the housing is possible with accompanying breakage.

The radial tooth system is configured asymmetrically, i.e. each tooth has a steep flank and an extremely flat flank.

The locking tooth could slightly yield to allow deformation when jumping over the flat flank, and the steep flank no longer permits a reversal. Also this radial tooth system is molded in one cycle through appropriate configuration of the injection mold. As an alternative to the fixation by locking teeth, the use of mechanical connecting elements, such as, e.g., bolts, is also possible.

The power feed cable for power supply of the drive motors extends typically from the power source in the form of a socket receptacle.

The electromotive furniture drive is typically operated with a safety d.c. voltage. Hereby, there is the option to either plug a respective transformer with downstream converter as unitary structure into the socket receptacle, or to mount it within the furniture drive. Regardless which configuration is selected, a socket receptacle is installed in the housing or the motor pot so that the power feed cable is provided with a plug on the associated end. This is preferably a small socket receptacle either of flat format or round format. Another embodiment involves each conductor of the power feed cable to carry a plug.

As the assembled linear drives are oftentimes installed in areas that are hard to reach, and the electric connection would be cut when the plug loosens, a preventive measure includes the placement of a securing element over the plug either from inside the housing or the motor pot, or from outside. The securing element being attached from inside may have a fork-shaped configuration.

When attached, the securing element would deform so that a rebound motion takes place in a certain position. The securing element placed onto the plug from outside may has a cap-shaped configuration. Also in this case, the form-resiliency or material-resiliency of plastic may be exploited to attach this securing element and to fix it by resilient locking, for example.

According to a further configuration, a guide element for the lifting tube is inserted in the free end zone of the flanged tube. This guide element is made of a flange which is closely received in the flanged tube and an attached guide bushing.

Sealing of the lifting tube is realized by a sealing element which is associated to the guide element and has a ring-shaped configuration. This sealing element has a sealing lip with a lesser hardness compared to the ring part. Especially advantageous is a single-piece construction of this sealing element and the guide element through manufacture by a two-component injection molding process. Use of standard sealing rings is, however, also possible for sealing. This requires upon the free end zone of the flanged tube the placement of a flap closure which is connected to the flanged tube by mechanical connection elements like bolts, pins, grooved studs, or the like.

Sealing of the components between the flange, the lifting tube, the flanged tube, the housing, the motor pot, and the attachment part is realized by a sealing element associated to the gap to be sealed. This sealing element may be a standard part, for example in the form of a toroidal sealing ring or a flat packing. Permanent-elastic and hardenable liquid seals may also be possible. According to a further configuration, it is also conceivable that the sealing element is designed as single-piece form part made with the afore-stated components by the two-component injection molding process.

In order to be able to use standardized sealing elements, the outer surface area of the flanged tube has a steady curvature at least in the sealing zone or is configured with circular cross section.

As stated above, the linear drive is preferably configured as spindle drive. A limit switch rail is therefore used for limitation of the end positions of the spindle nut on the spindle. The flanged tube is hereby provided with respective pockets.

The rail, receiving the limit switches, is preferably wider than the limit switches.

The limit switches may be configured such that the motor current is cut as a switch approaches or a control signal is triggered causing a cut of the motor current.

There may be a desire to construct linear drives involved here in the form of furniture drives such as to lower the attached piece of furniture at increased speed. Therefore, it is provided to disengage the drive train at a suitable location. This is implemented, for example, by a bar linkage or a Bowden pull which is accessible from outside.

The seal of the attachment element from the housing or from the motor pot is preferably realized by a standardized sealing ring which is generally designated as O ring.

As described above, the linear drive is equipped with a spindle and a spindle nut. Although the end positions of the spindle nut are normally determined by limit switches, it is provided for safety reasons that the spindle nut moves against a stop in the event a limit switch should be defective.

According to a most simple embodiment, the spindle nut is guided through the cross section configuration of the flanged tube. A simplest embodiment involves hereby an oval cross section of the flanged tube or a contour on the inner side which deviates from the circular ring shaped configuration.

The spindle is suitably connected form-fittingly on the motor-proximal side with the wheel by which it is propelled, for example tumbled, pinned, toothed, or the connection is realized by upsetting. The need for additional connecting elements may thus be eliminated.

The spindle nut is suitably provided with a formed switching lobe to operate the limit switches in the end positions. The spindle nut is preferably configured as so-called safety spindle nut, i.e. it is comprised of a plastic part to transmit the linear motion and a safety part to ensure the operating safety in the even of certain wear.

The safety part is preferably metallic and could also be configured to allow the user to recognize that the spindle nut has worn out.

It may be required to allow loosening of the interconnected parts, for example for repair or maintenance works. Therefore, the electromotive linear drive is provided with a respectively configured tool aid for loosening the safety elements.

As the linear drives involved here are mass articles which should be manufactured in an inexpensive manner, the number of components can be further decreased by widening or thickening the housing-distal spindle end for implementing a form-fitting end stop for the spindle nut.

BRIEF DESCRIPTION OF THE DRAWING

The invention will now be described in more detail with reference to the drawings, in which:

FIGS. 1 to 3 show the linear drive according to the invention by way of three different views, FIG. 6a is an enlarged detailed view of an area encircled in FIG. 6 and marked A;

FIG. 6b is a perspective view of a motor pot of the linear drive of FIG. 6 for connection to a housing, illustrating the presence of at least one locking tooth;

DETAILED DESCRIPTION OF PREFERRED EMBODIMENTS

Figure 4:
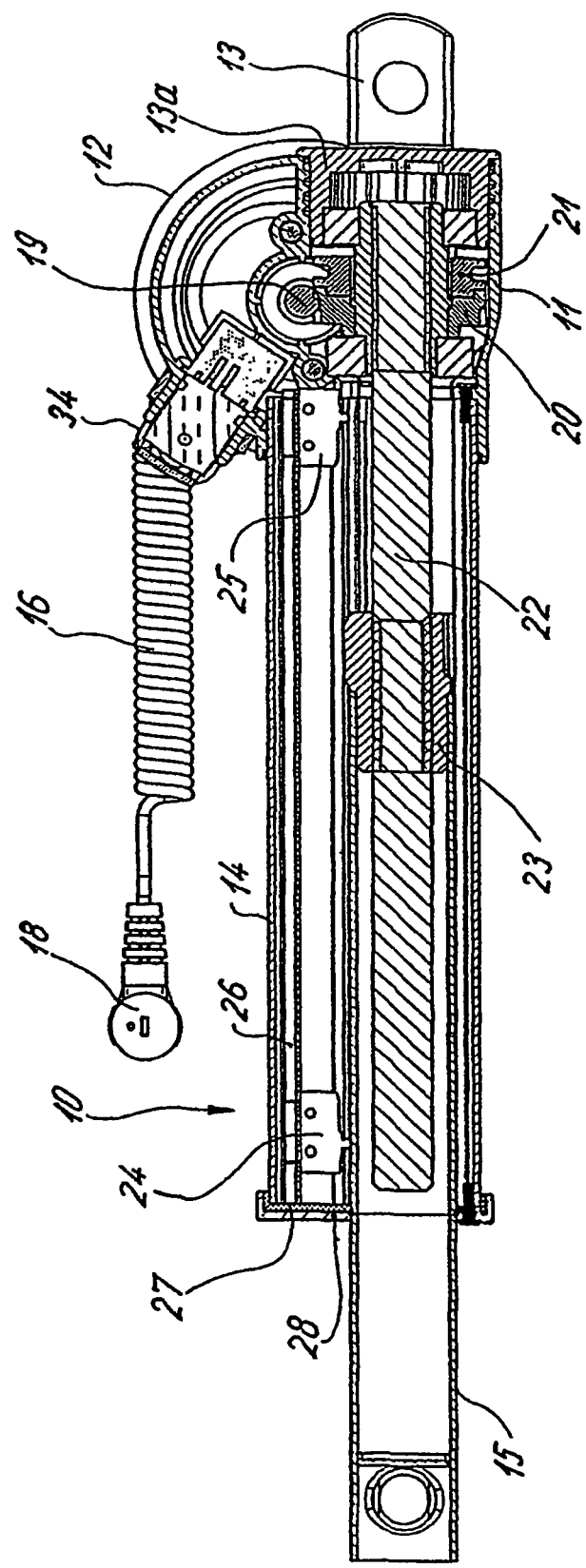
FIG. 4 is a longitudinal section of the linear drive.

The linear drive 10 illustrated in the Figures has a housing 11 which has attached thereto a motor pot 12 in a manner yet to be described in more detail, an attachment element in the form of a fork head 13, and a flanged tube 14.

The linear drive is further provided with an extendible lifting tube 15 which is guided in the flanged tube 14 in a manner yet to be described in more detail.

The afore-described components may be made of plastic.

The power supply of the linear drive 10 is realized via a power feed cable 16 which is provided on both ends with plugs 17, 18. The plug 17 may be inserted in a socket receptacle which is mounted in or on the housing 11. In a manner not shown in detail, each individual conductor of the power feed cable 16 has its own plug or has a continuing connection element with the continuing conductor. The plug 18 is inserted in a socket receptacle of a transformer with downstream converter.

FIG. 4 shows the basic configuration of the linear motor 10.

The d.c. motor is connected with the housing 11 and drives a worm 19 which is placed in fixed rotative engagement on the drive pin. The drive pin itself may also be configured as worm.

The worm 19 is connected to a worm wheel 20 which is operatively connected to a release disk 21 to disengage the drive train. The worm wheel 20 is rotatably supported on the bushing 31 and connected by interference fit via the release disk 21 to the spindle 22.

According to a preferred embodiment, the worm wheel 20 is securely placed upon the bushing 31. This embodiment is characterized by the absence of the release disk 31 and of the release lever 30 and its bearing. The worm wheel 20 and the bushing 31 may alternatingly form also a single-piece form part.

The spindle nut moves either in the direction to its free end or in the direction of the worm wheel 20 in dependence on the rotation direction of the spindle 22.

Placed on the spindle nut 23 is the lifting tube 15. The end positions of the spindle nut 23 are predefined by two limit switches 24, 25 which are mounted on a limit switch rail 26 secured in the flanged tube 14. The positions of the limit switches 24, 25 can be varied.

The free end of the flanged tube 14, distal to the worm wheel 20 and the housing 11, is closed by a seal 27 and an end cap 28, as will be described in greater detail with reference to FIG. 8.

Figure 5:
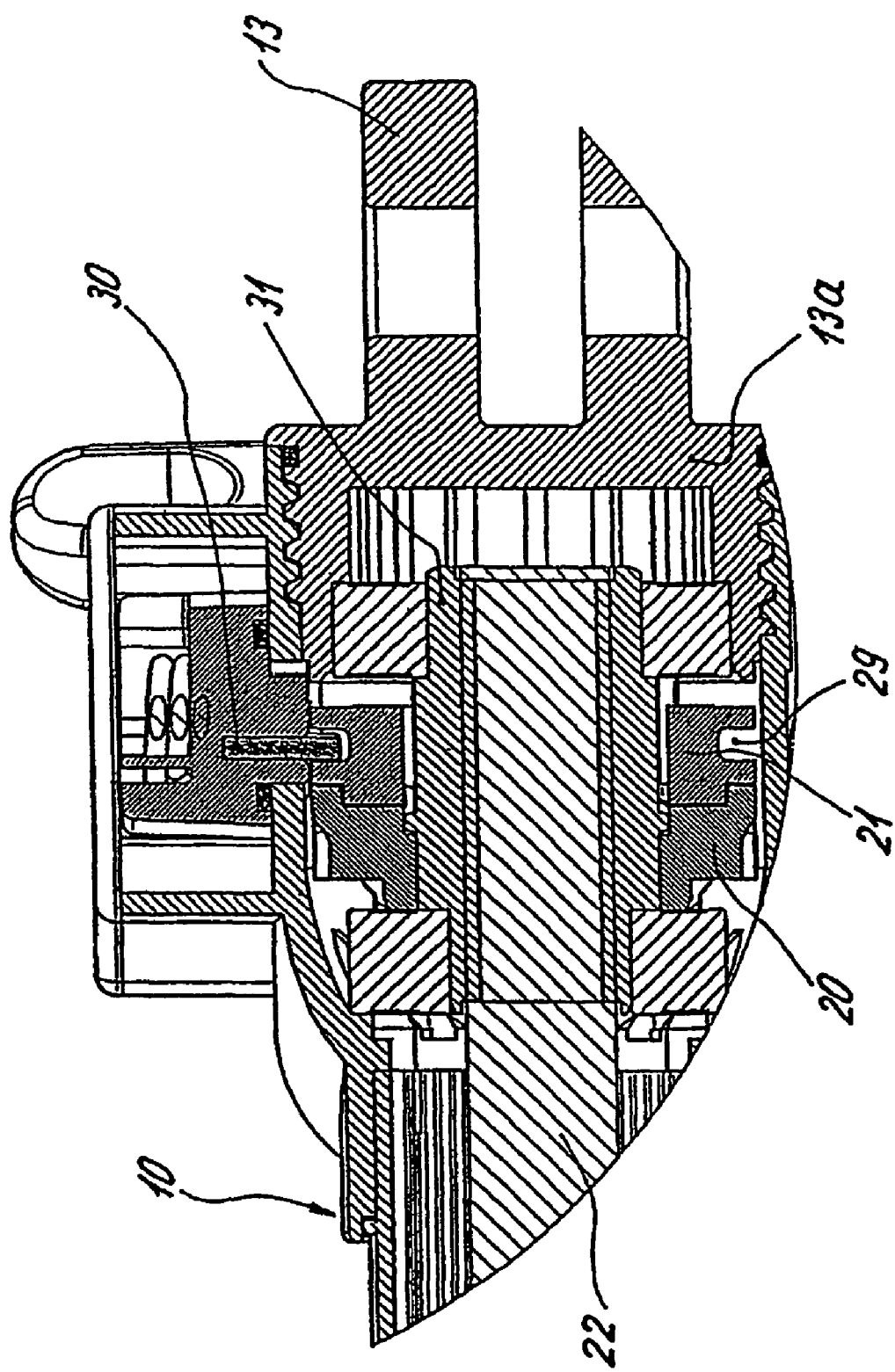
FIG. 5 is a cutaway sectional view, on an enlarged scale, of FIG. 4.

FIGS. 4 and 5 show the attachment element in the form of the fork head 13 provided with a cylindrical protrusion 13a which includes an external thread. Thus, the housing 11 is provided with an internal thread. This thread has multiple threads, preferably four threads, so that the fork head 13 can be secured in a 90° rotated position in contrast to the illustrated embodiments according to FIGS. 4 and 5.

In a manner not shown in greater detail, the fork head 13 is secured against inadvertent loosening. The securing elements may be configured as locking tongues like in the case of the motor pot 12. According to a preferred embodiment, a mechanical connection element, e.g. a bolt, is used. The fork head 13 can thus be loosened by removing the securing element. As a result, it is possible to unscrew this fork head 13 from the housing 11 even after assembly of the drive, and to secure the fork head 13 again, through renewed threaded engagement, however at offset angle, in this offset position via the multiple threads. Subsequently, the securing element is again inserted.

FIG. 5 shows the release disk 21 provided with a circumferential annular groove 29 for engagement by a release lever 30. The release lever 30 is guided outwards and can be optionally operated so that the driving connection is interrupted.

The illustrated embodiment is so configured that the worm wheel 20 is loosely placed upon a bushing 31, and the driving connection to the spindle 22 takes place from the worm wheel 20 onto the release disk 21 and via the bushing 31 to the spindle 22.

Figure 6:
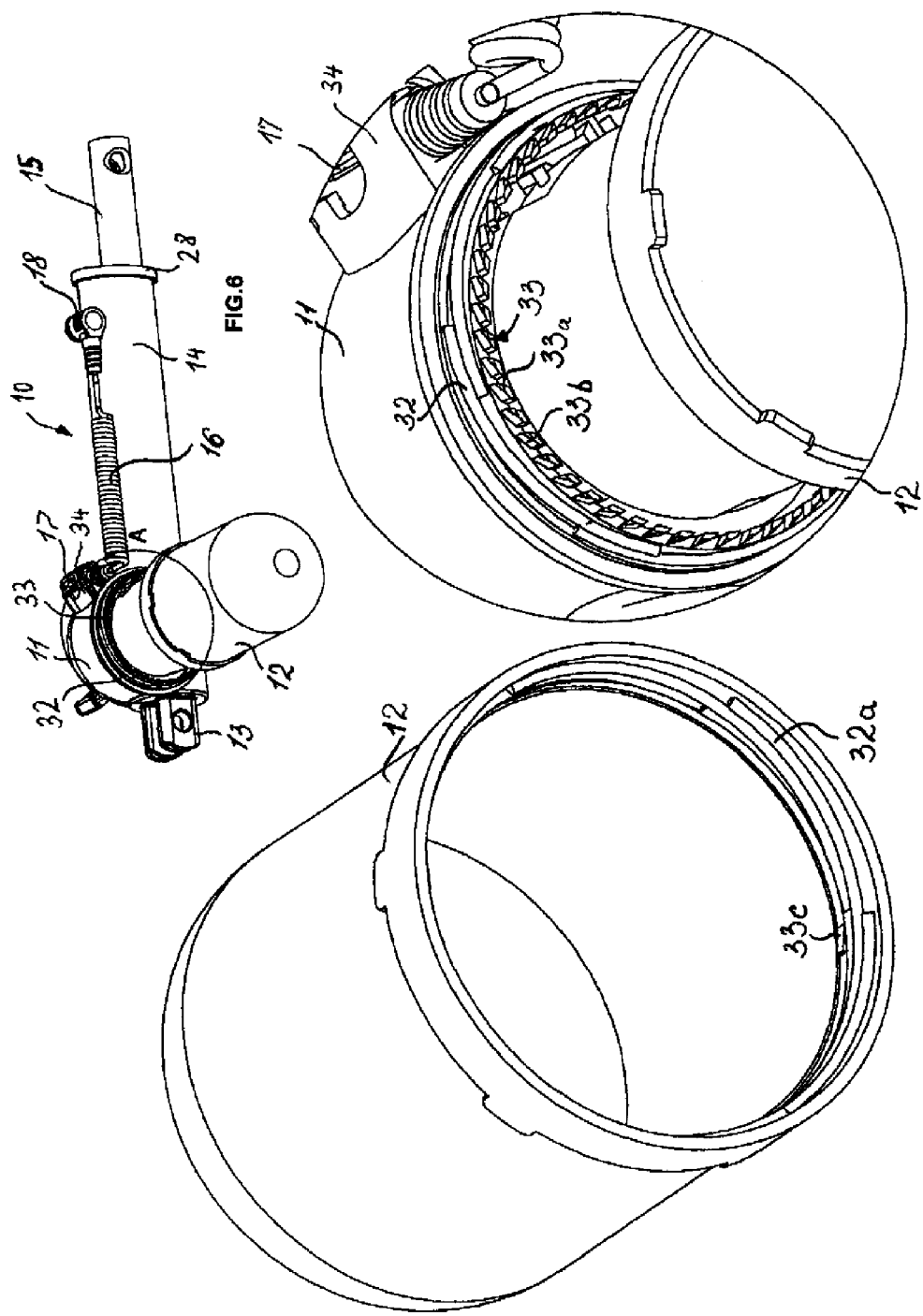
FIG. 6 is a perspective illustration of a further embodiment of the linear drive.

FIG. 6 shows the linear drive 10 with detached motor pot 12. FIG. 6 further shows the housing 11 provided with external threads 32. Thus, the motor pot 12 is provided with matching internal threads 32a so that the motor pot 12 is secured to the housing 11 through rotation.

This threaded connection is secured in addition. This is attained in the illustrated exemplified embodiment by a radial tooth system 33 which lies on a circular ring.

The individual teeth of the radial tooth system 33 have each a flat flank 33a and a steep flank 33b, as shown in FIG. 6a. The motor pot 12 has at least one locking tooth 33c (FIG. 6b) so that the individual teeth of the radial tooth system 33 can be skipped when the motor pot 12 is turned. In a particular position, it is no longer possible to further turn the motor pot 12. A detachment by turning from the threads 32 of the housing 11 is also not possible.

FIG. 6 further shows that the plug 17, associated to the housing 11, is secured by a cover cap 34 placed thereupon. As a result, the electric connection of the plug 17 with the socket receptacle is protected against tensile forces when the power feed cable 16 is pulled. In contrast to this illustration, the tensile relief may also be realized by an inner securing element of forked configuration which is placed over the plug 17 inside the housing 11.

Figure 7:
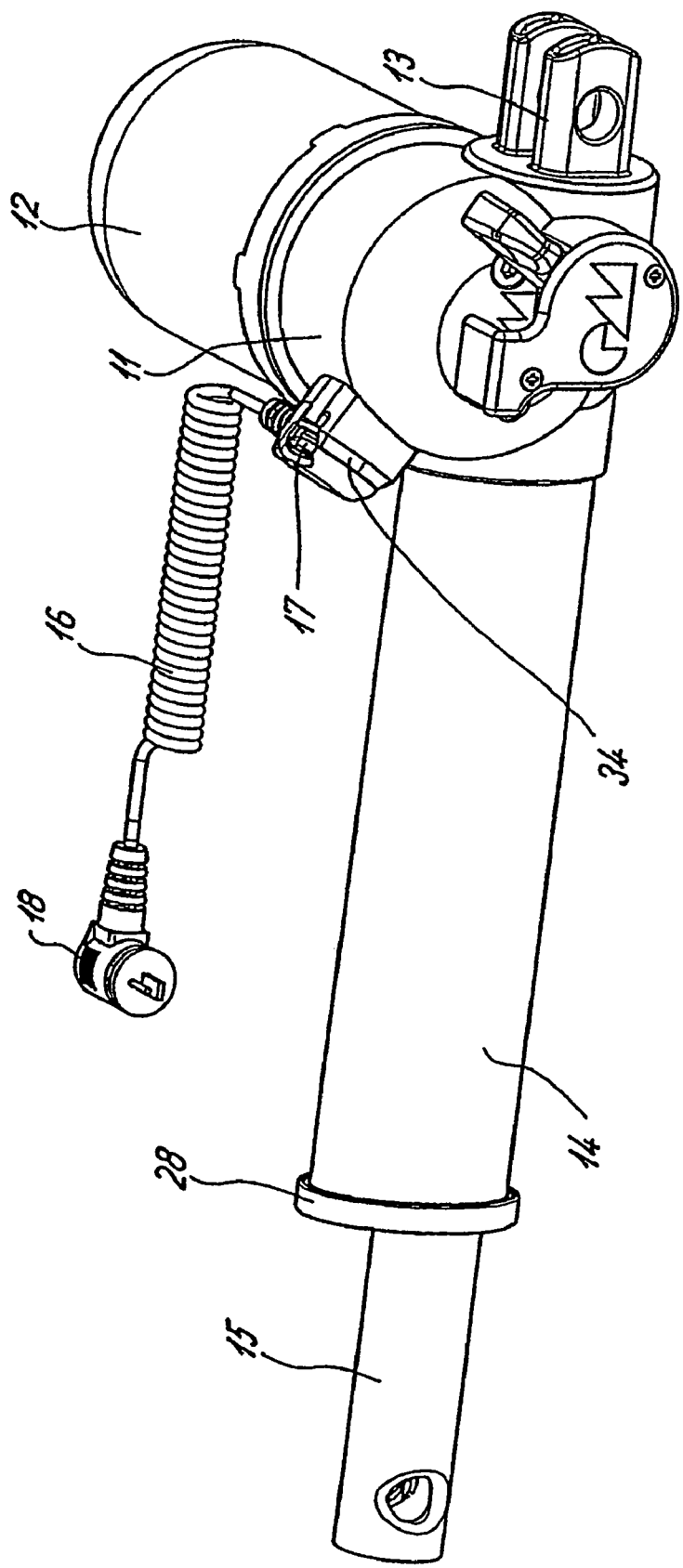
FIG. 7 is another view of the linear drive according to FIG. 6.

FIGS. 6 and 7 further show the provision of the lifting tube 15 with a transverse bore in the free end zone for connection with a lever or a connecting rod of a fitting.

FIG. 7 shows the drive of FIG. 6 in a rotated disposition.

It should also be noted that the flanged tube 14 has an oval-shaped cross section.

The spindle nut 23 has an outer contour which conforms to the inner contour of the flanged tube so as to closely guide the spindle nut.

FIG. 4 further shows that the spindle 22 projects into the housing 11 and is supported by two rolling-contact bearings which are placed upon the bushing 31.

Figure 8:
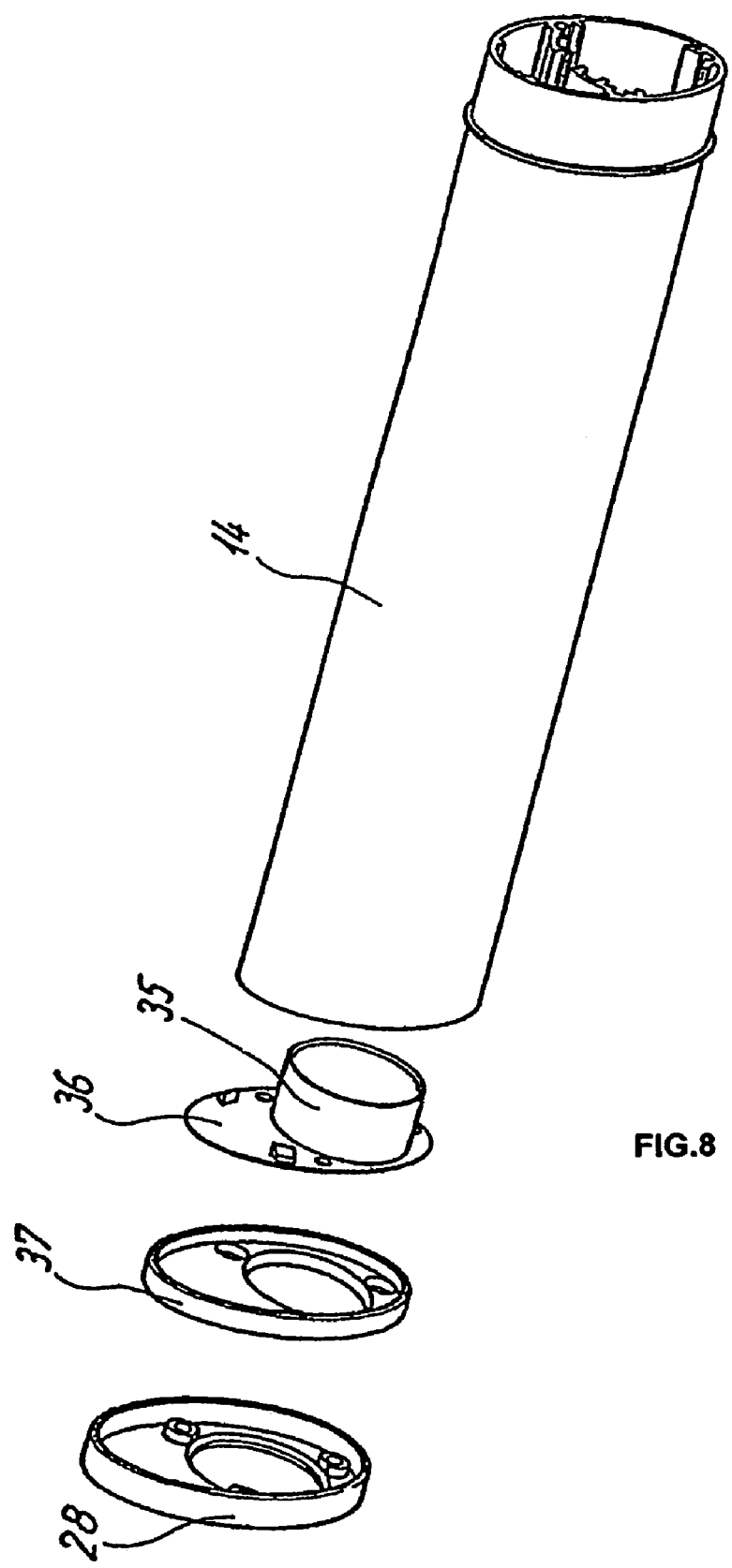
FIG. 8 is an exploded illustration of the flanged tube of the linear drive.

FIG. 8 shows the guidance of the lifting tube 15 in the flanged tube 14. A securing element is hereby inserted in the end of the flanged tube 14, distal to the housing 11, and is comprised of a guide bush 35 and a flange 36.

Sealing of the lifting tube 15 is realized by a sealing element 37 which matches to the contour of the flanged tube 14 and is provided with a bore. The sealing element 37 is made of relatively soft material.

The seal in the area of the bore is improved by providing a sealing lip of softer material. The sealing element 37 may be made by the two-component injection molding process. As an alternative, the guide element 35 may also be configured in one piece with the end cap 28, and the sealing element of relatively soft material made by the two-component injection molding process can be molded onto the end cap 28. The guide element and the sealing element 37 are fixed by the end cap 28 which is also provided with a bore in correspondence to the cross section of the lifting tube 15.

The end cap 28 is secured by bolts or pins or grooved studs which are screwed into respective channels of webs extending inside the flanged tube 14.

The fork head 13 may be connected as last part with the housing 11, while the motor pot 12 can be connected with the housing 11 after assembly of the worm drive or also in an intermediate stage. The securing elements may not only be designed in the form of locking tongues which are formed on the components to be connected with one another. It is also possible, in addition or instead, to use mechanical connection elements in the form of bolts, rivets or the like, or also in addition or instead to use material unions in the form of glues for securement.

In a manner not shown in greater detail, electronic components and electronic circuits for measuring, evaluating, controlling and regulating may be accommodated inside the housing 11, the motor pot 12, or the flanged tube 14. Further-more, these components or circuits for electric energy supply or energy preparation may be added or be responsible therefore.

The invention is not limited to the illustrated exemplary embodiment. It is only essential that the housing 11 is cylindrically shaped in the connection zones with the motor pot 12 and the attachment element 13 and provided with threads so that the involved components can be connected with the housing 11 through turning.

What is claimed is:

1. An electromotive linear drive for adjusting a moving component of a piece of furniture, comprising:
   a housing,
   a d.c. motor connected to the housing for operating a lifting tube which is operatively connected to the component,
   at least one motor casing disposed in surrounding relationship to the d.c. motor and having an internal thread for threaded engagement to the housing at a first cylindrical connection zone, and
   at least one attachment element extending at a substantially right angle in relation to the motor casing and having an external thread for threaded engagement to the housing at a second cylindrical connection zone, wherein the housing has a radial tooth system, and wherein the motor casing has at least one locking tooth of yielding material for engagement in a recess between neighboring teeth of the radial tooth system to define a securement between the housing and the motor casing.

2. The electromotive linear drive according to claim 1, wherein the housing and the motor casing have meshing threads to define the first connection zone, and the housing and the attachment element have meshing threads to define the second connection zone.

3. The electromotive linear drive according to claim 2, wherein the housing is provided with an external thread for connection to the motor casing, and an internal thread for connection to the attachment element.

4. The electromotive linear drive according claim 1, wherein the motor casing has a pot-shaped configuration and is open on a housing-proximal side, thereby defining an annular gap, and further comprising a seal received in the annular gap.

5. The electromotive linear drive according to claim 1, wherein the second connection zone between the housing and the attachment element has multiple thread portions.

6. The electromotive linear drive according to claim 5, wherein the attachment element is securable in two positions of the housing.

7. The electromotive linear drive according to claim 1, wherein the housing or the motor casing includes a socket receptacle, and further comprising a power feed cable having a plug in flat format or round format for insertion in the socket receptacle.

8. The electromotive linear drive according to claim 7, wherein the plug of the power feed cable for insertion in the socket receptacle is secured by a securing element.

9. The electromotive linear drive according to claim 8, wherein the securing element is a cover cap placed from outside upon the plug.

10. The electromotive linear drive according to claim 1, wherein the second connection zone between the housing and the attachment element has four thread portions.

11. The electromotive linear drive according to claim 1, wherein the motor casing extends at a substantially right angle in relation to the lifting tube.

12. The electromotive linear drive according to claim 1, wherein the attachment element is a fork head formed with a cylindrical protrusion which includes the external thread for engagement in an internal thread of the housing.

* * * * *